(12) United States Patent
Fahrenbach

(10) Patent No.: US 6,443,867 B1
(45) Date of Patent: Sep. 3, 2002

(54) ELECTRIC DRIVING SYSTEM

(75) Inventor: Jürgen Fahrenbach, Aichelberg (DE)

(73) Assignee: Schuler Pressen GmbH & Co. KG, Goeppingen (DE)

( * ) Notice: Subject to any disclaimer, the term of this patent is extended or adjusted under 35 U.S.C. 154(b) by 6 days.

(21) Appl. No.: 09/784,303

(22) Filed: Feb. 16, 2001

(30) Foreign Application Priority Data

Feb. 18, 2000 (DE) .......................................... 100 07 505

(51) Int. Cl.[7] .................................................. B30B 1/00
(52) U.S. Cl. .......................... 475/5; 475/149; 100/226; 100/257; 100/258
(58) Field of Search ..................... 475/5, 149; 310/112, 310/114, 74, 75 R; 100/226, 257, 258

(56) References Cited

U.S. PATENT DOCUMENTS

| | | | | |
|---|---|---|---|---|
| 3,860,100 A | * | 1/1975 | Spanke et al. | 192/18 A |
| 4,223,240 A | * | 9/1980 | Theyse | 310/74 |
| 4,987,794 A | * | 1/1991 | Brunner et al. | 100/257 |
| 5,007,303 A | * | 4/1991 | Okuzumi | 188/267 |
| 5,875,691 A | * | 3/1999 | Hata et al. | 475/5 |
| 6,049,150 A | * | 4/2000 | Chudleigh, Jr. | 310/178 |
| 6,247,399 B1 | * | 6/2001 | Yoshida | 100/257 |
| 6,311,597 B1 | * | 11/2001 | Schroth et al. | 100/266 |

FOREIGN PATENT DOCUMENTS

DE 4422527 12/1995

\* cited by examiner

Primary Examiner—Rodney H. Bonck
Assistant Examiner—Eric M Williams
(74) Attorney, Agent, or Firm—Crowell & Moring LLP

(57) ABSTRACT

An electric driving arrangement, particularly for press systems and/or their components, has a main electric motor for driving a flywheel. By way of a releasable coupling device, the flywheel drives an output shaft. An auxiliary electric motor can additionally be utilized for driving the drive shaft. The main electric motor and the auxiliary electric motor are arranged within the flywheel.

20 Claims, 1 Drawing Sheet

ELECTRIC DRIVING SYSTEM

BACKGROUND OF THE INVENTION

This application claims the priority of German Application 100 07 505.3, filed Feb. 18, 2000, the disclosure of which is expressly incorporated by reference herein.

The present invention relates to an. electric driving system, particularly for press systems and/or their components, comprising a main electric motor (5) for driving a flywheel (2) to drive a drive shaft (4) via a releasable coupling device, and an auxiliary electric motor (12) utilizable for driving the drive shaft.

A known driving system is described in DE 44 21 527 C2. Because of the two electric motors used in this driving system, a relatively variable drive of a press system can be obtained. The driving system described there is, among other things, because of the installation space required by it and because of its cumbersome construction, limited to a very narrow field of application.

SUMMARY OF THE INVENTION

An object of the present invention is to provide an electric driving system which can be operated in a very variable manner, can be used at very low expenditures for many different application purposes and requires only little space.

According to the invention, this object has been achieved by arranging the main and auxiliary motors within the flywheel.

As a result of the accommodation of the main electric motor and of the auxiliary electric motor within the flywheel, a modular construction of the electric driving system is obtained which permits the use of the driving system according to the invention for many different purposes. For example, the present invention can be used in many different types of press systems and individual presses and their components, as for example, in the case of ejector systems or transfer systems, and which requires little space.

The construction according to the present invention leads to an extremely compact driving system which, in many different applications, requires very low adaptation and mounting expenditures. As a result of the two mutually independent electric motors in the case of, for example, presses, the no-load stroke can be completely uncoupled from the working stroke, whereby particularly the no-load stroke is freely programmable.

In advantageous further developments of the present invention, a liquid cooling for the main electric motor and/or the auxiliary electric motor can be provided. This liquid cooling, which permits a considerably larger output of the respective liquid-cooled electric motor, can be used because of the compact construction of the driving system according to the invention whereas, with conventional driving systems, considerable difficulties were sometimes caused.

BRIEF DESCRIPTION OF THE DRAWINGS

Other objects, advantages and novel features of the present invention will become apparent from the following detailed description of the invention when considered in conjunction with the accompanying drawings.

The single FIGURE is a sectional view of an electric driving system according to the present invention.

DETAILED DESCRIPTION OF THE PREFERRED EMBODIMENT

Figure 1:
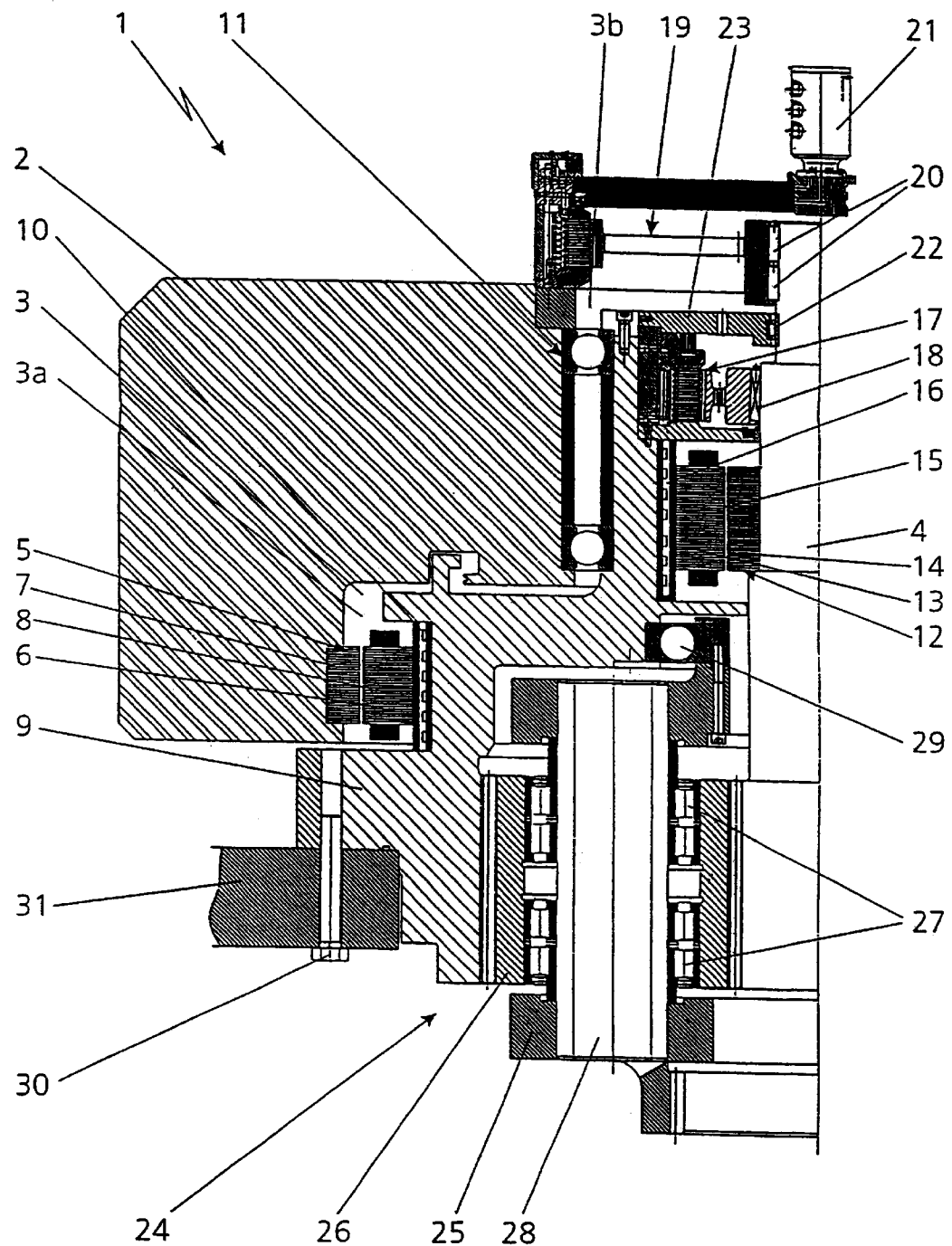

An electric driving system 1, for a press system, a single press, such as a toggle press or an eccentric press, or a device connected with the press, such as an ejector device or a transport device of known construction, has a flywheel. The flywheel 2 has a central opening 3 in which, among other things, a drive shaft 4 is arranged. The drive shaft 4 does not, however, come into contact with the wall of the central opening 3 of the flywheel 2 because additional components, which will be described in detail in the following, are situated in this opening 3.

The central opening 3 of the flywheel 2 has a step-shaped construction with essentially two steps 3a, 3b. The first step 3a has a larger diameter than the second step 3b and is arranged on the bottom side of the flywheel 2 on the side facing the device to be driven. Inside this first step 3a, a first electric driving device is housed which is called the main electric motor 5 and consists essentially of an interior stator 6 and an exterior rotor 7. Between the stator 6 and the rotor 7, an air gap 8 is situated which, in a known manner, is responsible for the output of the main electric motor 5. The rotor 7 is fixedly connected with the flywheel 2 and, when energized correspondingly, drives the flywheel 2, whereas the stator 6 is mounted on a carrier flange 9 whose function will be described in detail in the following. Between the stator 6 and the carrier flange 9, a cooling device 10 is additionally situated which cools the stator 6 and thus permits a higher output of the main electric motor 5.

The flywheel 2 is rotatably disposed on the carrier flange 9 by way of a bearing device 11 having two ball bearings, specifically inside the second step 3b of the central opening 3. On the side situated opposite the bearing device 11, the carrier flange 9 has a hollow construction, and a second electric driving device is arranged there which is called the auxiliary electric motor 12. The auxiliary electric motor 12 also has a stator 13, a rotor 14 as well as an air gap 15 situated in-between, although, in this case, the stator 13 is situated on the outside and the rotor 14 is situated on the inside. Concretely, the rotor 14 is arranged on the drive shaft 4 and is therefore capable of driving the drive shaft 4, and the stator 13 is connected with the carrier flange 9 by way of an additional cooling device 16. Similar to the cooling device 10, the cooling device 16 is used for cooling the stator 13 and therefore permits a higher output of the auxiliary electric motor 12.

Above the auxiliary electric motor 12, also in the second step 3b of the central opening 3, a braking device 17 is arranged which may be of a construction known per se and is connected by way of an arbitrary shaft-hub connection 18 with the drive shaft 4 and can brake the latter, if required. The braking device 17 is of a construction known per se and will therefore not be described in detail in the following. A coupling device 19, which in the present case operates hydraulically, is connected with the drive shaft 4 and, by way of an also arbitrary shaft-hub connection 20, establishes and separates the engagement between the flywheel 2 driven by the main electric motor and the drive shaft 4. Furthermore, the coupling device 19 has an oil supply container 21 which, in the case of an also conceivable electromagnetic coupling device 19, can also be constructed as an electric energy supply. For the operation of the press or of the device to be driven, it is basically provided that the flywheel 2 be driven continuously and the coupling device 19 only be engaged as required.

Between the braking device 17 and the coupling device 19, the drive shaft 4 is disposed by way of a bearing device 22 opposite a flange element 23 connected with the carrier flange 9. Thus, the drive shaft 4 can be driven by the main electric motor 5 by way of the flywheel 2 and the coupling device 19 as well as directly by the auxiliary electric motor 12. However, the drive shaft 4 does not form the direct drive for the machine or press to be driven but a transmission device 24 is provided for the gearing-down or gearing-up of the rotational speed of the drive shaft 4 to an output shaft 25 of the transmission device 24. The output shaft 25 therefore forms the actual drive for the press or the device to be driven. In the case of fast-running machines and presses, under certain circumstances, the transmission device 24 can also be eliminated.

The transmission device 24 is constructed as a planetary transmission which has the carrier flange 9 as the ring gear. The sun gear is formed by the drive shaft which drives several planet gears 26, of which, in the present case, only one is shown. By way of respective toothings, each planet gear 26 engages with the drive shaft 4 as well as with the carrier flange 9. Furthermore, the planet gears 26 are disposed by way of bearing devices 27 on respective bolts 28 which are fixedly connected with the output shaft 25. The planet carrier or the output shaft 25 is disposed opposite the carrier flange 9 by way of an additional bearing device 29.

In the case of the present planetary transmission 24, the ring gear or carrier flange 9 therefore stands still, for the purpose of which, the latter is connected by way of fastening elements 30 constructed as screws with a part 31 of the press to be driven. The sun gear or drive shaft 4 drives the planet gears 26 which, by means of their toothings, roll off on the inside diameter of the carrier flange 9, and in order to rotate the drive shaft 4. In this manner, the planet carrier or the output shaft 25, which also rotates about the drive shaft at a lower rotational speed than the drive shaft, forms the output. Thus, the high rotational speed of the drive shaft 4 can be reduced to a relatively low rotational speed for the output shaft 25 and a drive will exist which is suitable for many different presses.

An electric driving system 1 is therefore created in the case of which two completely mutually independent drives exist as a result of the main electric motor 5 and the auxiliary electric motor 12 which has a lower electric output. The auxiliary electric motor 12 is therefore freely programmable and can be connected as required and can therefore provide an additional drive of the device to be driven or can also brake the latter. This is advantageous in the case of a press, particularly in those conditions in which an additional driving output is required; usually therefore outside the actual working path, for example, in order to shorten the no-load stroke of a slide with respect to the time.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electric driving system for at least one of press systems and their components, comprising a main electric motor for driving a flywheel to drive a drive shaft via a releasable coupling device, and an auxiliary electric motor utilizable for driving the drive shaft, characterized in that the main electric motor and the auxiliary electric motor are arranged within the flywheel.

2. The electric driving system according to claim 1, wherein the flywheel has a central opening in which the main electric motor and the auxiliary electric motor are arranged.

3. The electric driving system according to claim 1, wherein the auxiliary electric motor drives the drive shaft directly.

4. The electric driving system according to claim 3, wherein the flywheel has a central opening in which the main electric motor and the auxiliary electric motor are arranged.

5. The electric driving system according to claim 1, wherein a cooling device is operatively associated with at least one of the main electric motor and/or the auxiliary electric motor.

6. The electric driving system according to claim 5, wherein the flywheel has a central opening in which the main electric motor and the auxiliary electric motor are arranged.

7. The electric driving system according to claim 6, wherein the auxiliary electric motor drives the drive shaft directly.

8. The electric driving system according to claim 1 wherein an output side of the drive shaft has a transmission device at least partially operatively arranged within the flywheel.

9. The electric driving system according to claim 8, wherein the transmission device comprises a planetary transmission having ring gear used as a stationary carrier flange for receiving components of the main and auxiliary electric motors.

10. The electric driving system according to claim 9, wherein a stator of the main electric motor is operatively arranged on the carrier flange, and a rotor of the main electric motor is operatively arranged on the flywheel.

11. The electric driving system according to claim 9, wherein a stator of the auxiliary electric motor is operatively arranged on the carrier flange, and a rotor of the auxiliary electric motor is operatively mounted on the drive shaft.

12. The electric driving system according to claim 11, wherein a stator of the main electric motor is operatively arranged on the carrier flange, and a rotor of the main electric motor is operatively arranged on the flywheel.

13. The electric driving system according to claim 9, wherein the drive shaft comprises a sun gear of the planetary transmission, between the drive shaft and the carrier flange, planet gears being driven by the drive shaft, and rolling off within the carrier flange, and a planet carrier carrying the planet gears forming the output shaft.

14. The electric driving system according to claim 13, wherein a stator of the main electric motor is operatively arranged on the carrier flange, and a rotor of the main electric motor is operatively arranged on the flywheel.

15. The electric driving system according to claim 14, wherein a stator of the auxiliary electric motor is operatively arranged on the carrier flange, and a rotor of the auxiliary electric motor is operatively mounted on the drive shaft.

16. The electric driving system according to claim 1 wherein the auxiliary electric motor is configured to have an output lower than an output of the main electric motor.

17. The electric driving system according to claim 16, wherein the flywheel has a central opening in which the main electric motor and the auxiliary electric motor are arranged.

18. The electric driving system according to claim 17, wherein the auxiliary electric motor drives the drive shaft directly.

19. The electric driving system according to claim 18, wherein a cooling device is operatively associated with at least one of the main electric motor and/or the auxiliary electric motor.

20. The electric driving system according to claim 19, wherein an output side of the drive shaft has a transmission device at least partially operatively arranged within the flywheel.

* * * * *